(12) United States Patent
Yuan et al.

(10) Patent No.: US 6,968,480 B1
(45) Date of Patent: Nov. 22, 2005

(54) PHASE ADJUSTMENT SYSTEM AND METHOD FOR NON-CAUSAL CHANNEL EQUALIZATION

(75) Inventors: Warm Shaw Yuan, San Diego, CA (US); Omer Fatih Acikel, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 147 days.

(21) Appl. No.: 10/383,400

(22) Filed: Mar. 7, 2003

Related U.S. Application Data

(63) Continuation-in-part of application No. 10/020,426, filed on Dec. 7, 2001, and a continuation-in-part of application No. 10/077,332, filed on Feb. 15, 2002.

(51) Int. Cl.[7] .......................... G06K 5/04; G11B 20/20; G11B 5/00
(52) U.S. Cl. ..................... 714/700; 714/789; 714/798
(58) Field of Search .............................. 714/700, 775, 714/789, 798

(56) References Cited

U.S. PATENT DOCUMENTS 3,633,108 A * 1/1972 Kneuer ..................... 375/254

* cited by examiner

Primary Examiner—Joseph D. Torres
(74) Attorney, Agent, or Firm—Law Office of Gerald Maliszewski; Gerald Maliszewski

(57) ABSTRACT

A system and method is provided for using phase adjustment in non-causal channel equalization in a communications system. The method comprising: receiving a serial data stream input; comparing a bit value in the serial data stream determined at a first phase with respect to a clock, to a bit value determined at a second phase; determining the optimal phase for the determination of bit values; and, using the optimal phase to determine subsequently received bit values. Typically, the serial data stream is encoded with forward error correction (FEC). Then, the method further comprises: FEC decoding the bit values determined at a plurality of phases. Determining the optimal phase for the determination of bit values includes calculating an error rate associated with the phases and, defining the optimal phase as the phase associated with a low error rate.

22 Claims, 7 Drawing Sheets

Fig. 6

DATA STREAM INPUTS $V_1$ — DEFINITE "1"

"0" IF BOTH 2ND AND 3RD BIT VALUE DECISIONS ARE "1"
"1" IF ONLY ONE OF THE 2ND AND 3RD BIT VALUE DECISIONS IS A "1"
"1" IF BOTH 2ND AND 3RD BIT VALUES ARE "0"

$V_{OPT}$

"1" IF BOTH 2ND AND 3RD BIT VALUE DECISIONS ARE "0"
"0" IF ONLY ONE OF THE 2ND AND 3RD BIT VALUE DECISIONS IS A "0"
"0" IF BOTH 2ND AND 3RD BIT VALUES ARE "1"

$V_0$ — DEFINITE "0"

Fig. 7B

| FIRST BIT ESTIMATE LINE 120a | 120b | 2ND BIT VALUE | 3RD BIT VALUE | 1ST BIT VALUE |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

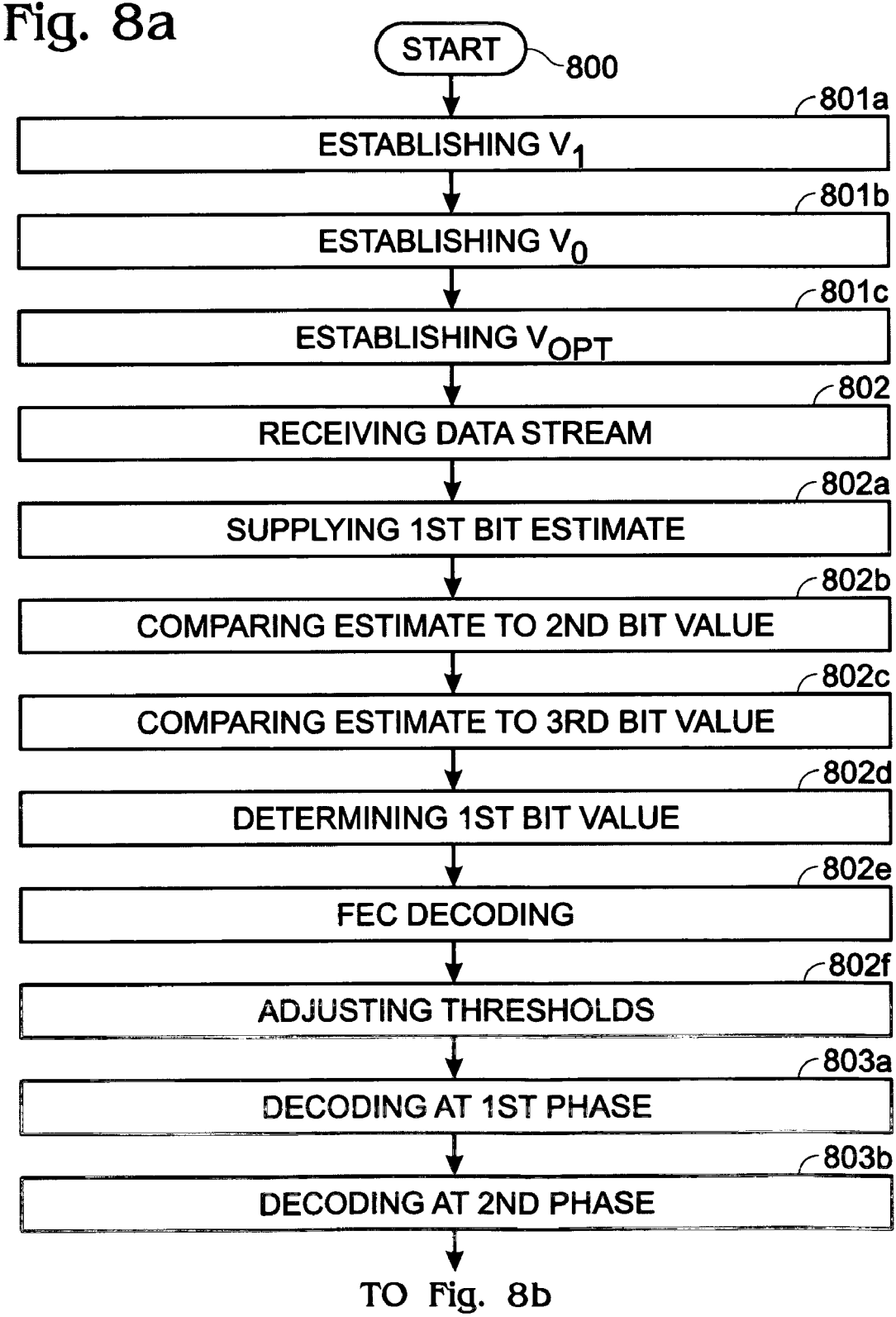

PHASE ADJUSTMENT SYSTEM AND METHOD FOR NON-CAUSAL CHANNEL EQUALIZATION

RELATED APPLICATIONS

This application is a continuation-in-part of a pending application entitled, SYSTEM AND METHOD FOR NON-CAUSAL CHANNEL EQUALIZATION, invented by Castagnozzi et al., Ser. No. 10/020,426, filed Dec. 7, 2001, and which is incorporated herein by reference.

This application is a continuation-in-part of a pending application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002, and which is incorporated herein by reference.

This invention generally relates to digital communications and, more particularly, to a system and method for minimizing the effects of inter-symbol interference in a data channel of binary coded information.

DESCRIPTION OF THE RELATED ART

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received analog waveforms that are part of a serial data stream of digitally encoded data, where the waveforms are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

There are numerous algorithms and techniques to find the optimum sampling time in a digital communication system. Peak detection with match-filter and early-late gate sampling are two techniques used widely for capturing sampling times. A general early-late gating scheme requires zero-crossing in the waveform. Peak detection match-filter approach is optimum when the channel and the transmitter characteristics are well known. However, early-late gating is difficult to apply if the zero-crossing is unknown. Further, peak detection is not effective without prior knowledge of the transmitter and/or channel characteristics.

It would be advantageous if inter-symbol interference caused by energy dispersion in a received data channel could be minimized.

It would be advantageous if serial data streams could be sampled at the phase that is most likely to yield a correct bit decision.

It would be advantageous if a non-causal channel analysis could be combined with a phase optimization process to minimize the effects of inter-symbol interference.

SUMMARY OF THE INVENTION

The present invention describes a process of controlling the phase (timing) of data samples in a system impaired by inter-symbol-interference (ISI) and by independent noise samples (white noise). The method is adaptive against varying channel conditions. That is, it adapts itself to changing ISI and noise conditions. The method is most effective when employed with a non-causal equalization scheme to reduce the effects of ISI. The present invention process finds the optimum sampling time to minimize BER, and in some aspects, uses BER estimates. Unlike prior art phase adjustment methods, the present invention does not require zero-crossing (can be applied to on-off keying) or any prior knowledge on the transmitter and the channel.

Accordingly, a method is provided for using phase adjustment in non-causal channel equalization in a communications system. The method comprising: receiving a serial data stream input; comparing a first (present) bit value in the serial data stream determined at a first phase with respect to a clock, to a first bit value determined at a second phase; in response to the comparisons, calculating the optimal phase for the determination of first bit values; and, using the optimal phase to determine subsequently received first bit values.

Typically, the serial data stream is received encoded with forward error correction (FEC). Then, the method further comprises: FEC decoding the first bit values determined at the first phase; and, FEC decoding the first bit values determined at the second phase. Calculating the optimal phase for the determination of first bit values in response to the comparisons includes the substeps of: calculating an error rate associated with the first phase; calculating an error rate associated with the second phase; and, defining the optimal phase as the phase associated with a low error rate. The comparison process typically involves comparing first bit value error rates at a plurality of phases.

Other aspects of the method include a non-causal channel equalization process involving the steps of: comparing a first bit estimate in the serial data stream to a second bit value received prior to the first bit; comparing the first bit estimate to a third bit value received subsequent to the first bit; and, in response to the comparisons, determining the value of the first bit.

Additional details of the above-described method and a phase adjustable non-causal channel equalization system are described below.

BRIEF DESCRIPTION OF THE DRAWINGS

FIG. 6 is a graph illustrating the thresholds established by the multi-threshold circuit.

FIGS. 7a and 7b are a schematic block diagram, and associated truth table, of the non-causal circuit of FIG. 5 in greater detail.

FIGS. 8a and 8b are flowcharts illustrating the present invention method for using phase adjustment in non-causal channel equalization in a communications system.

DETAILED DESCRIPTION OF THE PREFERRED EMBODIMENTS

Figure 1:
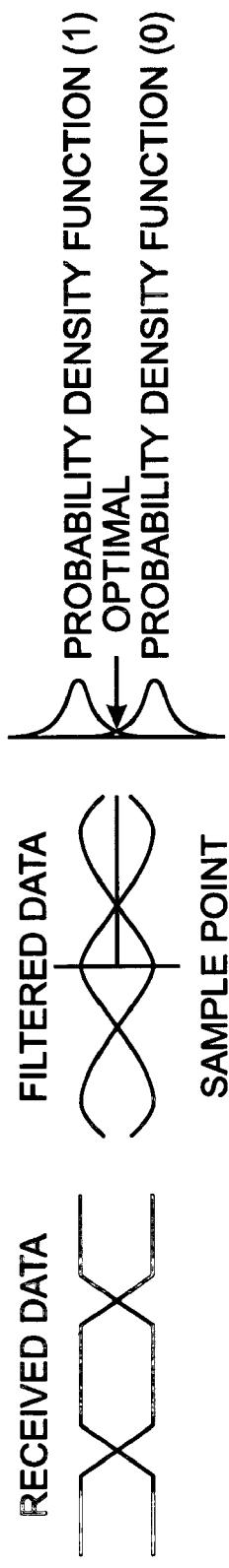
FIG. 1 is a diagram illustrating a signal recovered from a binary symmetric, non-dispersive channel in the presence of noise (prior art).
Figure 2:
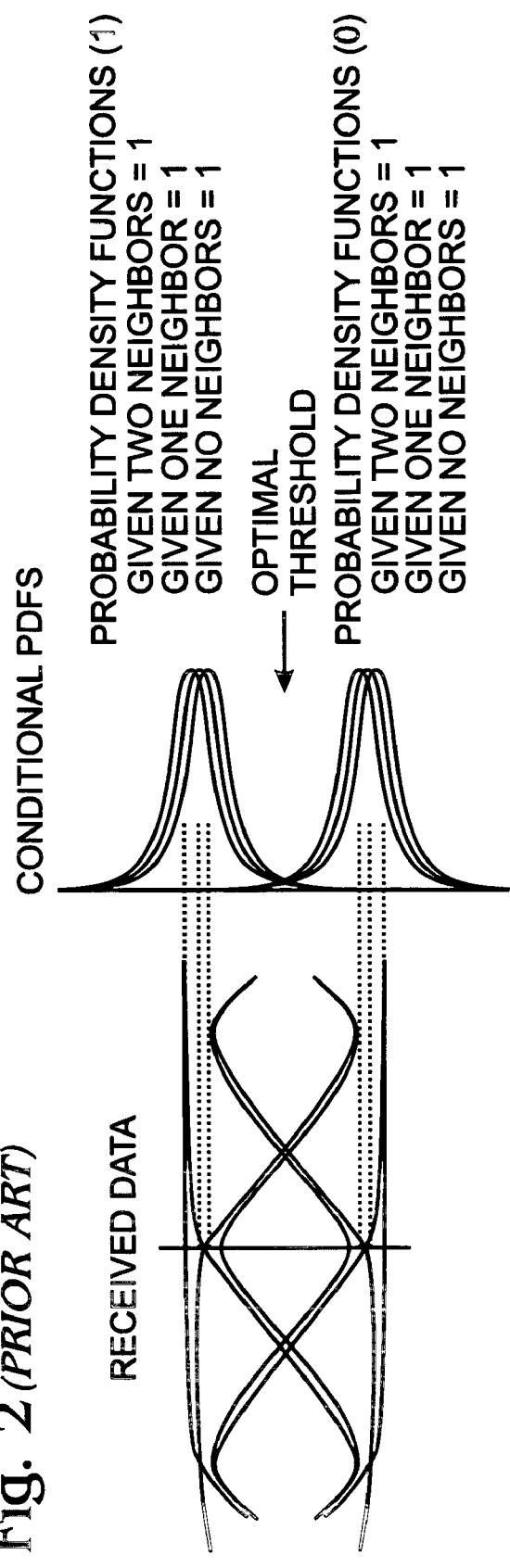
FIG. 2 is a diagram illustrating received analog waveforms that are part of a serial data stream of digitally encoded data, where the waveforms are distorted in response to the inter-symbol interference resulting from energy dispersion (prior art).
Figure 3:
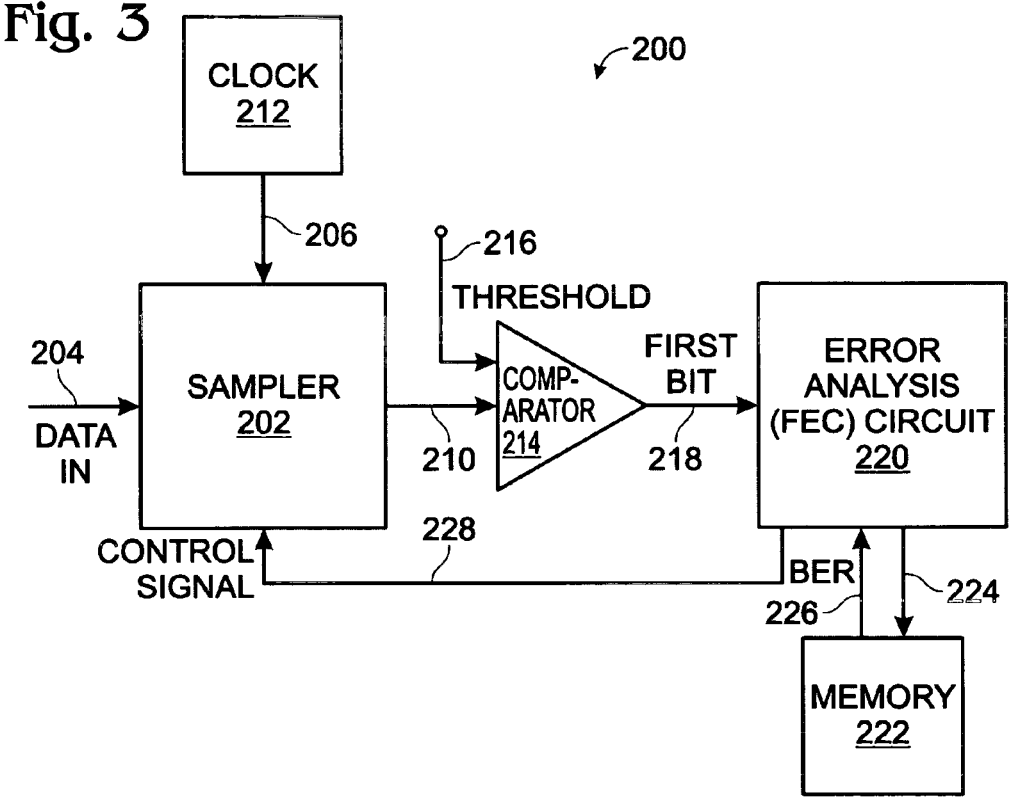
FIG. 3 is a schematic block diagram of the present invention phase adjustable non-causal channel equalization system.

FIG. 3 is a schematic block diagram of the present invention phase adjustable non-causal channel equalization system. The system 200 comprises a sampler 202 having an input on line 204 to receive a serial data stream and an input on line 206 to receive a clock signal. The sampler 202 has an input on line 208 to accept a control signal and an output on line 210 to provide a sample of the serial data stream sampled at a particular phase in response to the control signal. The term "serial data stream", as used herein, is defined as a serial stream of digitally encoded data. Typically, the serial stream is a digitally coded analog waveform.

A clock generator 212 has an output on line 206 to supply a clock signal with a clock period. The system includes at least one comparator 214. Additional comparators are used in other aspects of the invention, as explained below. The comparator 214 has an input connected to the sampler output on line 210 to accept the samples. The comparator 214 accepts threshold reference values on line 216 and supplies a first bit value on line 218.

An error analysis circuit 220 has an input connected to the output of the comparator 214 on line 218 to accept first bit values. The error analysis circuit 220 compares first bit values sampled at a first phase with respect to the clock signal, to first bit values determined at a second phase. Then, the error analysis circuit 220 calculates an optimal phase for the determination of first bit values and supplies a control signal on line 228 responsive to the optimal phase. In this manner, the comparator is set to make a decision at the optimum time (phase).

In some aspects of the system 200, the sampler 202 receives a serial data stream encoded with forward error correction (FEC). Then, more specifically, the error analysis circuit 220 can be considered an FEC circuit that decodes the first bit values determined at the first and second phases. The FEC circuit 220 calculates error rates associated with the first and second phases and defines the optimal phase associated with a low error rate.

Two test phases have been mentioned above as an example. In other aspects, the sampler 202 derives a plurality of relative phases respective to the clock signal, and the FEC circuit 220 determines first bit value error rates at the corresponding plurality of phases. The sampler 202, using the clock signal as a reference, defines n phases in the clock period. The FEC circuit 220 determines the bit error rate (BER) at each of the n phases.

Figure 4:
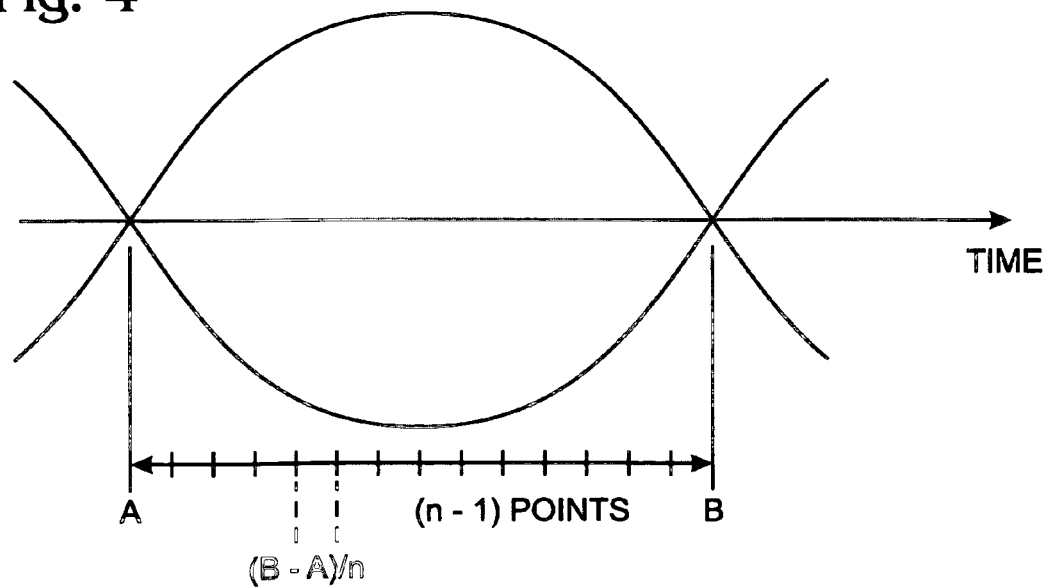
FIG. 4 is a timing diagram illustrating the phase partitioning.

FIG. 4 is a timing diagram illustrating the phase partitioning. The sampler defines n phases in the clock period as follows:

defining a time A as a start phase;
defining a time B as an end phase;
defining the time between phases as (B−A)/n, where n is the number of phases being defined.

Then, a series of relative phase positions (i) in the clock period can be defined as:

$$i = A, A+(B-A)/n, \ldots B-(B-A)/n, B.$$

In other aspects, the sampler calculates an optimum clock phase (O) by considering each phase position (i), weighted by its respective BER as follows:

$$Q = \sum_{i=A}^{B} i * f(BER_i);$$

where f(x) is a function of x.

Returning to FIG. 3, in some aspects the system 200 further comprises a memory 222 having a port connected to the FEC circuit 220 on line 224 for accessing a plurality of calculated BERs cross-referenced to error counts in a lookup table (LUT). The FEC circuit 220 determines the bit error rate (BER) at each of the n phases by counting the number of errors associated with each phase and accessing the LUT in memory for the BER cross-referenced to the error count. More specifically, the LUT supplies BER (~1/error count) on line 226 in response to an error count.

Figure 5:
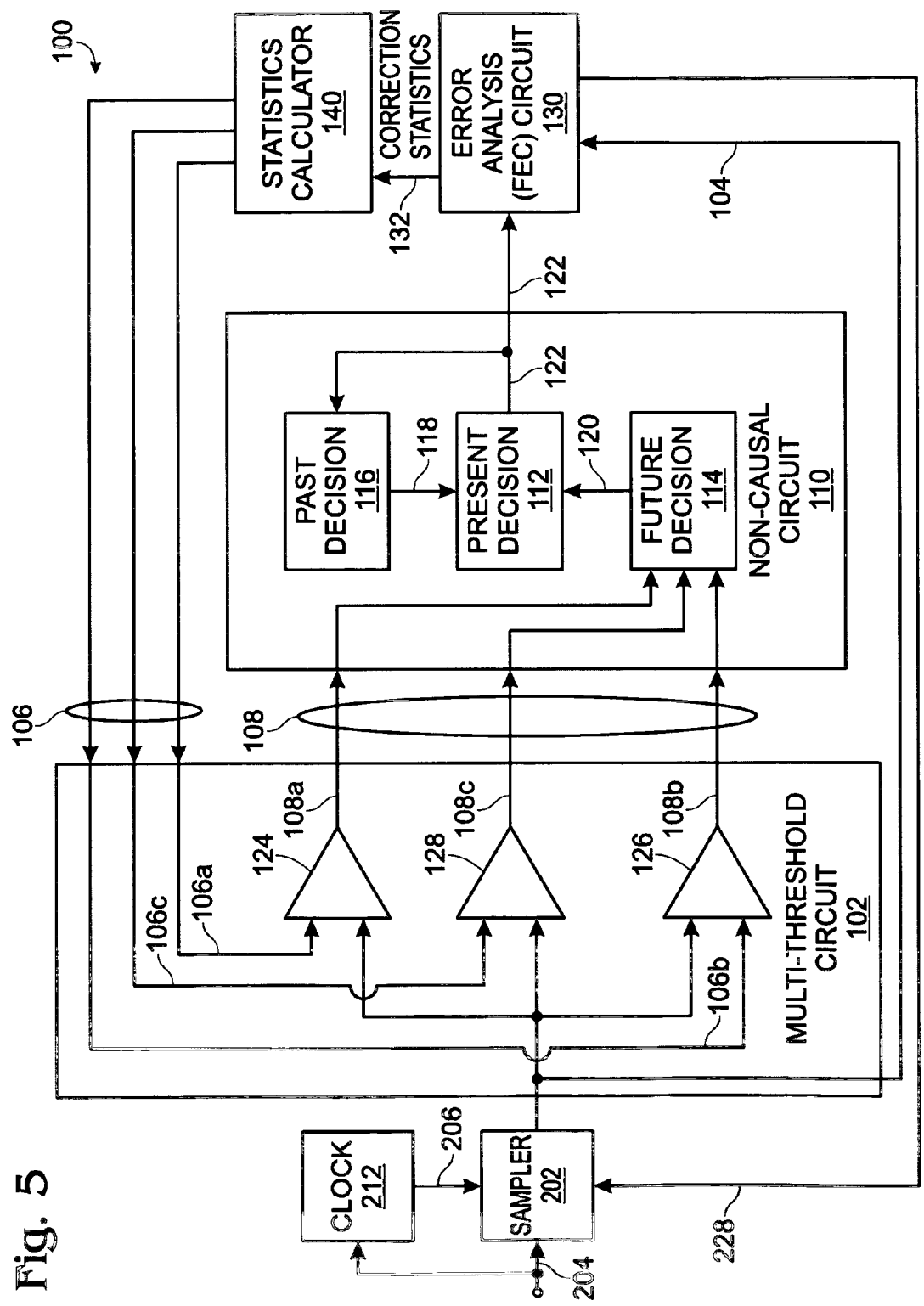
FIG. 5 is a schematic block diagram of the present invention system incorporating a non-causal channel equalization communication system.

FIG. 5 is a schematic block diagram of the present invention system incorporating a non-causal channel equalization communication system. In system 100, the comparator of FIG. 3 includes a multi-threshold circuit and a non-causal circuit. The multi-threshold decision circuit 102 has an input connected to the sampler output on line 104 to accept the samples, an input on line 106 to accept threshold values, and outputs on line 108 to provide bit estimates responsive to a plurality of voltage threshold levels.

Although only a single input data stream is shown, it should be understood that the present invention system is also applicable to multi-channel systems where a plurality of serial data inputs are combined into a multi-level phase-shift keying or multi-level quadrature amplitude modulation format. With respect to any particular input data line, the sampler 202 may accept a data stream binary protocol such as NRZ or RZ, for example. However, the present invention system is not necessarily limited to just these example protocols. Alternately, the present invention system is applicable to channel equalizing multiple lines of parallel data, such as a 32-bit data bus for example. It should be understood that the present invention system is applicable to any binary symmetric, or even asymmetric communication protocol. Further, the invention is applicable to binary communication protocols regardless of whether the clock is recovered from the data stream, or the clock is supplied as an independent signal. In some aspects of the system 100, the clock 212 has an input on line 204 to accept the serial data stream, and the clock supplies a clock signal generated from the serial data stream. As mentioned above, the serial data stream can be a digitally coded analog waveform.

A non-causal circuit 110 has inputs on line 108 to accept the bit estimates from the multi-threshold decision circuit 102. The non-causal circuit 110 compares a current bit estimate (a first bit) to bit values decisions made across a plurality of clock cycles. The non-causal circuit 110 has an output on line 122 to supply a bit value decision for the current bit estimate to the error analysis circuit 130 determined in response to the non-causal bit value comparisons.

The non-causal circuit 110 includes a present decision circuit 112, a future decision circuit 114, and a past decision circuit 116. The future decision circuit has inputs connected to the mutli-threshold circuit outputs on line 108. The future decision circuit 114 has outputs to supply the first bit estimate and the third bit value (as explained below). The present decision circuit 112 has inputs to accept the first bit estimate, the third bit value, and a second bit value from the past decision circuit 116. The present decision circuit 112 compares the first bit estimate in the data stream to the second bit value received prior to the first bit estimate, represented as being supplied from the past decision circuit 116 on line 118. The present decision circuit 112 also compares the first bit estimate to the third bit value received subsequent to the first bit estimate, represented as being from the future decision circuit 114 on line 120. The present decision circuit 112 has an output on line 122 to supply a first bit value determined in response to comparing the first bit estimates to the second and third bit values.

FIG. 6 is a graph illustrating the thresholds established by the multi-threshold circuit. The following discussion should be considered in light of both FIGS. 5 and 6. The multi-threshold circuit 102 includes a first comparator 124 having an input to accept the sampled data stream on line 104, an input connected on line 106a to establish a first threshold (V1), and an output on line 108a to supply a signal distinguishing when the data stream input has a high probability of being a "1" bit value. A second comparator 126 has an input on line 104 to accept the sampled data stream, an input on line 106b to establish a second threshold (V0), and an output on line 108b to supply a signal distinguishing when the data stream input has a high probability of being a "0" bit value. More literally, the second comparator 126 supplies a "0" when the sampled data stream input on line 104 has a high probability of being a "0".

A third comparator 128 has an input on line 104 to accept the sampled data stream, an input on line 106c to establish a third threshold (Vopt), and an output on line 108c to provide a signal when the sampled data stream input has an approximately equal probability of being a "0" value as a "1" value. Distinguishing between a "1" and a "0" is a process that is performed by the non-causal circuit 110.

The multi-threshold circuit 102 and the non-causal circuit 110 work together to perform a non-causal analysis, regardless of whether the system incorporates the FEC circuit 130. When the multi-threshold circuit 102 receives a data stream input below the third threshold (Vopt) and above the second threshold (V0), the present decision circuit (of the non-causal circuit 110) responds by supplying a (first) bit value of "1" on line 122, if both the second and third bit values are "0" on lines 118 and line 120, respectively. Otherwise, the present decision circuit 112 supplies a bit value of "0", if only one of the second and third bit values is a "0", or if both the second and third bit values are a "1". When the multi-threshold circuit 102 receives a data stream input above the third threshold and below the first threshold, the present decision circuit 112 responds by supplying a bit value decision of "0" if both the second and third bit values are "1". The present decision circuit 112 supplies a bit value decision of "1" if only one of the second and third bits is a "1" value, or if both the second and third bit values are a "0".

In some aspects of the system, the sampler 202 accepts a data stream encoded with forward error correction (FEC). Then, the error analysis circuit 130 is a forward error correction (FEC) circuit having an input on line 122 to receive the (first) bit values from the non-causal circuit 110. The FEC circuit 130 decodes the first bit values determined at the first and second phases and calculating error rates associated with the first and second phases. The FEC circuit 130 defines the optimal phase as the phase associated with a low error rate. The FEC circuit 130 has an additional output on line 132 to supply a first bit correction statistics.

The system 100 further comprises a statistics calculator 140 having an input on line 132 to receive correction statistics from the FEC circuit 130. The statistics calculator 140 has an output on line 106, more specifically, lines 106a, 106b, and 106c, to supply threshold values to the multi-threshold circuit 102 in response to the correction statistics received from the FEC circuit 130.

The statistics calculator 140 evaluates the number of errors associated with a plurality of three-bit sequence combinations, where each sequence includes the second bit value, followed by the first (center) bit value, followed by the third bit value, and the error is in the first (center) bit value. More specifically, the statistic calculator 140 evaluates the number of errors associated with a plurality of three-bit sequence combinations by comparing the number of errors between different groups of three-bit sequences. The statistics calculator 140 adjusts the thresholds (on lines 106a, 106b, and 106c) to balance the number of errors between a first group of three-bit sequences and a second group of three-bit sequences.

In some aspects, the statistics calculator 140 evaluates the number of errors associated with a plurality of three-bit sequence combinations by comparing different groups of three-bit sequences, where the first (center) bit value has been FEC corrected. In other aspects, the statistics calculator 140 evaluates the number of errors associated with a plurality of three-bit sequence combinations by comparing different groups of three-bit sequences, where the first (center) and second bit values have been FEC corrected. Alternately, the statistics calculator 140 compares different groups of three-bit sequences, where the first (center) and third bit values have been FEC corrected.

For example, statistics calculator 140 may track statistics of the number of corrections in the first bit when the first bit is determined to be a "0" value and:

the second and third bits are both "0" values;

the second bit is a "1" value and the third bit is a "0" value;

the second bit value is a "0" and the third bit is a "1" value; or, the second and third bits are both "1" values.

Likewise, the statistics calculator 140 may track statistics of the number of corrections in the first bit when the first bit is determined to be a "1" value and:

the second and third bits are both "0" values;

the second bit is a "1" value and the third bit is a "0" value;

the second bit value is a "0" and the third bit is a "1" value; or, the second and third bits are both "1" values.

Eight patterns can be generated from all the possible 3-bit combinations. These eight patterns correspond to the four probability density functions described in the Functional Description Section, below. Note that not every pattern, or correction statistic need be used in the calculation of a particular threshold. Further, each threshold may be calculated in response to a different group of statistics. In addition, the calculation of some thresholds may be an indirect result of statistical analysis. For example, V1 and V0 may be determined in response to statistical analysis, while Vopt is set midway between V1 and V0.

In other aspects of the system, additional statistics can be used to determine threshold. For example, the statistics calculator 140 may additionally track statistics of the total number of first bit "0" value errors and the total number of first bit "1" value errors, and supply threshold outputs in response to the total number of "0" and "1" error statistics. Then, the thresholds can be set in reference to a combination of ten different correction statistics.

As noted above, the sampler 202 accepts a serial data stream protocol such as binary symmetric, binary asymmetric, non-return to zero (NRZ), or return-to zero (RZ). It should be understood that if the present invention system 100 accepts multiple serial input data lines, for example two input lines, then the system would include separate subsystems for each line, where each subsystem would include a sampler, multi-threshold circuit, non-causal circuit, and FEC circuit (if applicable), and/or statistics calculator (if applicable). For simplicity, a single input line and a single associated subsystem have been shown and described. Alternately, in some aspects a single (sub)system can be multiplexed between input lines. If multiple input lines are received, then the system may include additional circuitry (not shown) to combine the two lines of input data (after channel equalization) and perform multi-level demodulation, or the combination of multiple bits into parallel bus words of information.

Although not explicitly shown, an extrapolation of the system 100 of FIG. 5 may alternately include a first plurality of samplers, each accepting a corresponding serial data stream. A first plurality of multi-threshold decision circuits would each have an input connected to the output of a corresponding sampler. Likewise, a first plurality of non-causal circuits would each have an input to accept bit estimates from a corresponding multi-threshold decision circuit. A first plurality of FEC circuits would each have an input connected to the output of a corresponding non-causal circuit. The first plurality of samplers could accept information modulated in a format such as first-level phase-shift keying and first-level quadrature amplitude modulation format.

Note that the term "first-level" as used above, directly corresponds to the number of serial data input streams. For example, two samplers may accept information from two input data streams modulated in a two-level quadrature amplitude modulation (4QAM) format. In this example, "first" would be equal to the number "2". In another example, the present invention channel equalization system could accept 32 input data lines and, after equalization, decode the 32 first bit value (every clock period) as a parallel data or address bus.

Figure 7A:
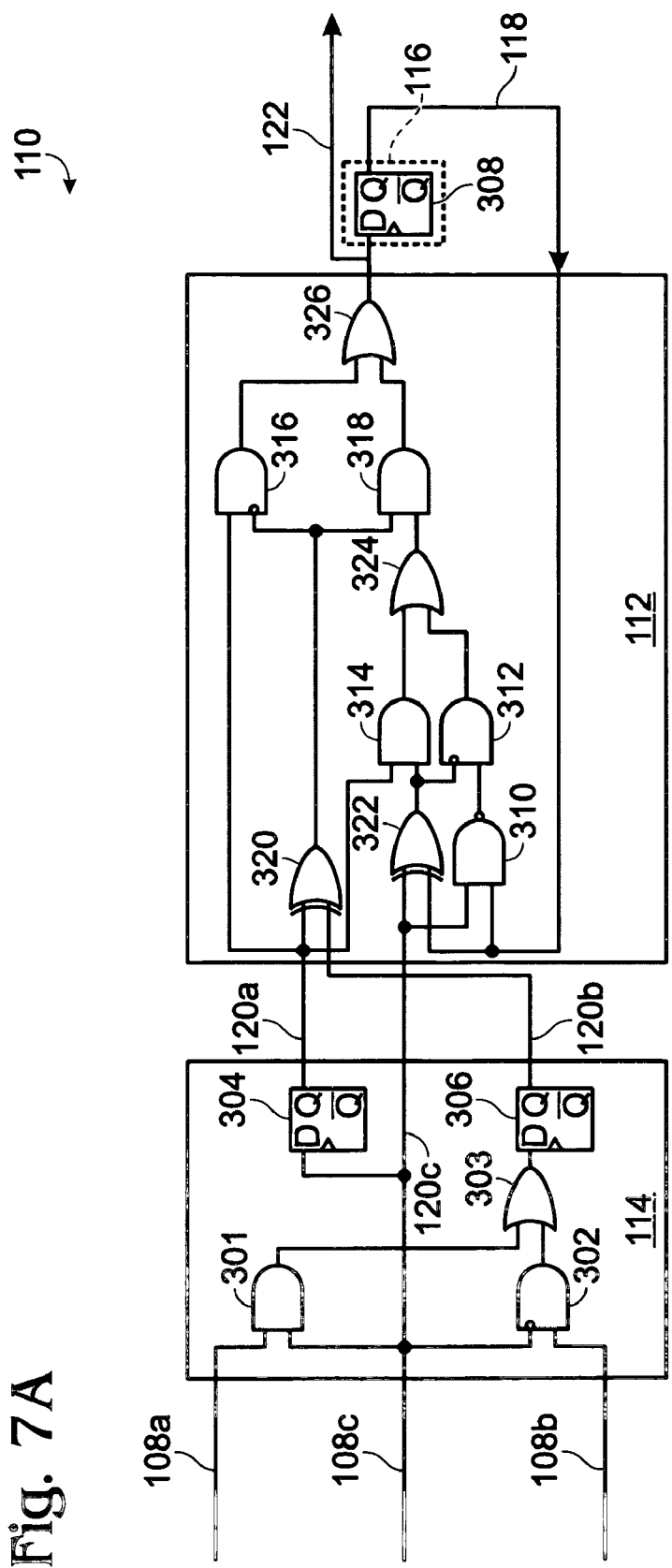

FIGS. 7*a* and 7*b* are a schematic block diagram, and associated truth table, of the non-causal circuit 110 of FIG. 5 in greater detail. FIG. 7*a* represents only one of many designs that can be used to embody the invention. The future decision circuit 114 has inputs connected to the outputs of the first, second, and third comparators of the multi-threshold circuit on lines 108*a*, 108*b*, and 108*c*, respectively. These three lines correspond to the thresholds shown in FIG. 6. The future decision circuit 114 passes the third comparator signal through on line 120*c*. This signal is called the third bit value. The future decision circuit 114 performs AND and OR operations using AND circuit 301, AND circuit 302, and OR circuit 303. Delays of one clock cycle are added using flip-flops 304 and 306. When the data stream input is less than V0, the estimates on line 120*a* and 120*b* are "0,0", respectively. When the data stream input is between Vopt and V0, the estimates on lines 120*a* and 120*b* are "0,1", respectively. When the data stream input is between Vopt and V1, the estimates on lines 120*a* and 120*b* are "1,0", respectively. When the data stream input is above V1, the estimates are lines 120*a* and 120*b* are "1,1", respectively. The combination of lines 120*a* and 120*b* is called the first bit estimate.

The past decision circuit 116 delays the first bit value on line 122 one clock cycle to supply the second bit value on line 118. Again, a D flip-flop 308 is used for the delay.

The present decision circuit 112 has inputs connected to the future decision circuit outputs to accept the first bit estimate and third bit value on lines 120*a*, 120*b*, and 120*c*, respectively. The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, AND circuits 310 through 318 are employed. Note that AND circuits 316 and 318 have one inverted input and that 310 has an inverted output (NAND). Also used are OR and XOR gates 320 through 326. Again, alternate circuit designs can accomplish the same functions. More important is the relationship between the signal inputs and signal outputs.

FIG. 7*b* is a truth table illustrating the operation of the present decision circuit 112 of FIG. 7*a*. The non-causal circuit 110 of the present invention system of FIG. 5 can be implemented using many different combinations of circuits. More critical is the actual task performed. This task is more clearly defined in light of the truth table diagram.

The first four lines in the table illustrate the case where the data input, at a clock period associated with a first bit, is below V0. The first bit value is made in comparison to the four different combinations of the second and third bit values. Likewise, the second four lines in the table illustrate the case where the data input, at a clock period associated with a first bit, is above V0 and below Vopt. The third set of four lines in the table illustrates the case where the data input is above Vopt, but below V1. The last set of four lines in the table illustrates the case where the data input is above V1.

FUNCTIONAL DESCRIPTION

The present invention reduces the effects of channel impairments in a digital communication system by finding the optimum sampling time to minimize the BER. The method has two states: initialization and tracking states.

The initialization state includes the following steps:
1. Define/find the extreme sampling points in opposite directions (early and late sampling points), where the optimum sampling point is between the extremes. Call these extreme sampling points A and B. Assume A and B are positive numbers and that B>A.
2. Divide the length of time between A and B into n−1 points. Each of the n sampling points is a candidate for the optimum sampling point. Therefore, the accuracy of the true sampling point is increased by increasing the value of n.
3. Collect averaged BER measurements at each sampling point and call them $BER_i$, where i=A, A+(B−A)/n, ..., B−(B−A)/n, B.

Calculate the following weighted average:

$$Q = \sum_{i=A}^{B} i * f(BER_i)$$

where $f(BER_i)$ is a weighted functions of $BER_i$, respectively. In its simplest form, $f(BER_i)=BER_i$. The Q value is the optimum sampling point count for the initialization process. Apply the Q sampling value and store the averaged $BER_Q$ value.

The tracking state operation follows the initialization state process and is applied periodically to find better sampling points to adapt varying channel/signal conditions. Below are the steps for the tracking state:
1. From the optimal sampling point count Q of the previous calculations, sweep M sampling points with X counts per sampling point to the left (early sampling) and store the averaged BER values. This allows a total sweep of M*X count from Q value.
2. From the optimal sampling point count Q, sweep M sampling points with X counts per sampling point to the right (late sampling) and store the averaged BER values. This allows a total sweep of M*X count from Q value. The accuracy of the new sampling point is higher with decreasing X values. M value is a function of X and the variations in the channel.
3. If any of the sweep sampling point BER values, on either side, are lower than $BER_Q$, then assign this new sampling point as Q, and store the associated BER value as $BER_Q$. Otherwise, hold the Q counter value and $BER_Q$ until next cycle of sweeping.

The non-causal circuit is used as a high performance decision device prior to FEC decoding in the system. FEC decoding provides additional information on the validity of the estimates made by the non-causal circuit as a by-product of the error correction procedure. This information can be processed and used to optimize the decision points of multi-threshold circuit. Error rate information on the relative probability of a ones ("1s") error vs. a zeros ("0s") error is collected for the four cases of the probability density function (PDF). Specifically:

| | |
|---|---|
| PDF 1) | P(errorred one \| no neighboring 1s) |
| | P(errorred zero \| no neighboring 1s) |
| PDF 2) | P(errorred one \| preceding neighbor 1) |
| | P(errorred zero \| preceding neighbor 1) |
| PDF 3) | P(errorred one \| following neighbor 1) |
| | P(errorred zero \| following neighbor 1) |
| PDF 4) | P(errorred one \| two neighboring 1s) |
| | P(errorred zero \| two neighboring 1s) |

Since most FEC encoded systems are typically scrambled to insure a 50% mark ratio, statistical data for each of the three cases can be reduced to a ratio. Each threshold can be adjusted to achieve the ones/zero ratio that provides the best fit for the channel in use. In many cases this will be ~50%. For cases in which dispersion is symmetric, PDF 2 and PDF 3 are combined to a single statistic.

In addition, statistics can be collected for the total number of corrected "0"s and the total number of corrected "1"s. Note that the statistics for the number of corrected "0"s and "1"s can be determined from an analysis of the above-mentioned eight patterns, called PDF1 through PDF4. These 10 statistics (the eight PDF patterns, plus the two total error sums) can be used to control the threshold levels. For example, V1 may be set in response to S(101)+S(111)−S(011), where S(101) represents the accumulated "0" errors when the neighboring (second and third) bit values are "1"s, where S(111) represents the accumulated "1" errors when the neighboring bit values are both "1"s, and where S(011) represents the accumulated "1" errors when the preceding bit value is a "0" and the subsequent bit value is a "1". Thus, any of the thresholds can be set in response to various combinations of the above-mentioned 10 statistics. The present invention is not limited to an analysis of any particular number or type of the above-mentioned statistics. Neither is the invention necessarily limited to the analysis of just these 10 statistics as other statistics, although perhaps more complicated and processor intensive, can be collected in response to selected bit value sequences.

Figure 8B:
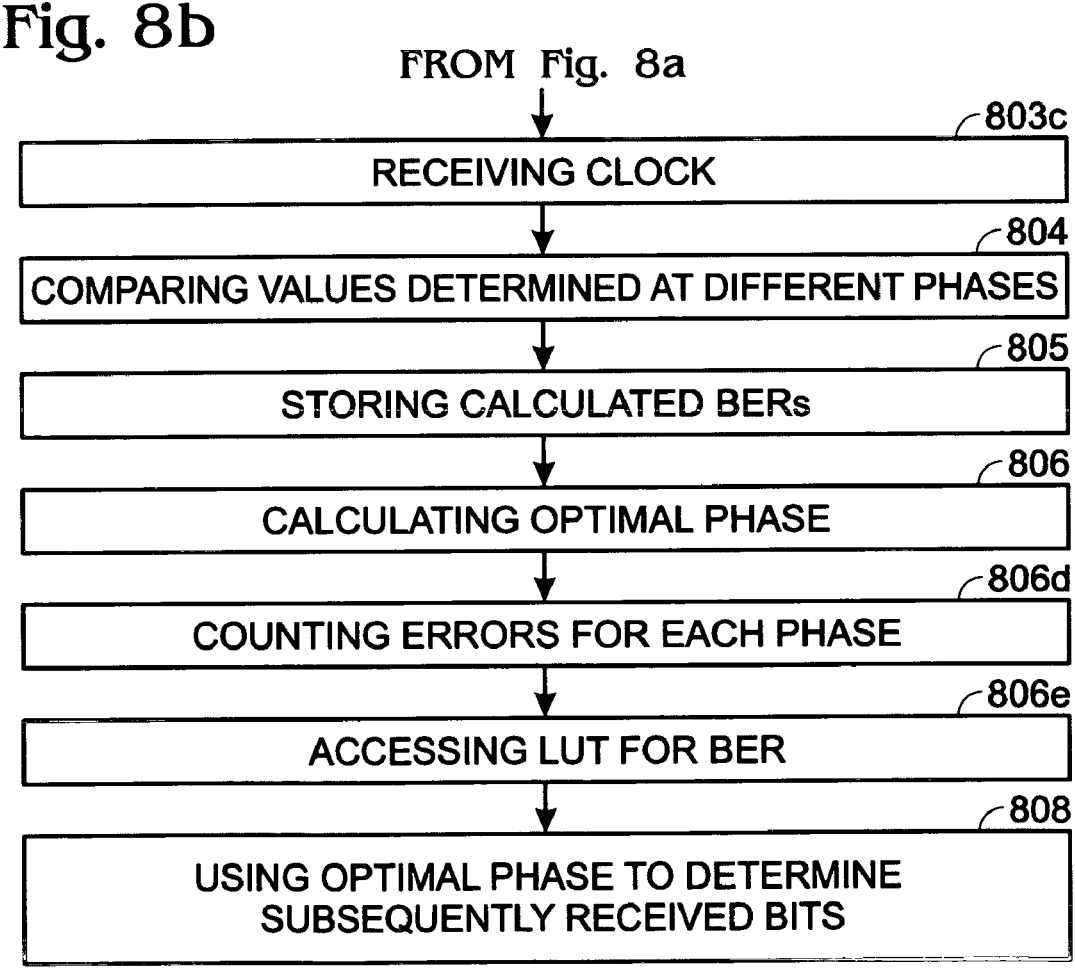

FIGS. 8a and 8b are flowcharts illustrating the present invention method for using phase adjustment in non-causal channel equalization in a communications system. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 receives a serial data stream input, as defined above. Step 804 compares a first bit value in the serial data stream determined at a first phase with respect to a clock, to a first bit value determined at a second phase. Step 806, in response to the comparisons, calculates the optimal phase for the determination of first bit values. Step 808 uses the optimal phase to determine subsequently received first bit values.

In some aspects of the method, receiving a serial data stream in Step 802 includes receiving a serial data stream encoded with forward error correction (FEC). Then, the method comprises additional steps. Step 803a FEC decoding the first bit values determined at the first phase. Step 803b FEC decoding the first bit values determined at the second phase. Calculating the optimal phase for the determination of first bit values in response to the comparisons in Step 806 includes substeps (not shown). Step 806a calculates an error rate associated with the first phase. Step 806b calculates an error rate associated with the second phase. Step 806c defines the optimal phase as the phase associated with a low error rate.

In some aspects, comparing a first bit value in the serial data stream determined at a first phase with respect to a clock, to a first bit value determined at a second phase (Step 804) includes comparing first bit value error rates at a plurality of phases.

Some aspects of the method include a further step. Step 803c receives a clock with a clock period. Then, determining first bit values at a plurality of phases in Step 804 includes, using the clock period as a reference, defines n phases in the clock period. Step 806, calculating the optimal phase then includes determines the bit error rate (BER) at each of the n phases.

In other aspects, defining n phases in the clock period (Step 804) includes substeps (not shown). Step 804a defines a time A as a start phase. Step 804b defines a time B as an end phase. Step 804c defines the time between phases as (B−A)/n, where n is the number of phases being defined. Step 804d defines a series of relative phase positions (i) in the clock period as:

$i=A, A+(B-A)/n, \ldots B-(B-A)/n, B.$

In some aspects, calculating the optimal phase for the determination of first bit values in response to the comparisons in Step 806 includes calculating an optimum clock phase (O) by considering each phase position (i), weighted by its respective BER as follows:

$$Q = \sum_{i=A}^{B} i * f(BER_i);$$

where f(x) is a function of x.

In other aspects a further step, Step 805 stores a plurality of calculated BERs cross-referenced to error counts in a look-up table (LUT). Then, determining the bit error rate (BER) at each of the n phases (Step 806) includes other substeps. Step 806d counts the number of errors for each phase. Step 806e accesses the LUT for the BER cross-referenced to the error count, as described in the explanation of FIG. 3 above.

Other aspects of the method include further steps. Step 801a establishes a first threshold (V1) to distinguish a high probability "1" first bit estimate. Step 801b establishes a second threshold (V0) to distinguish a high probability "0" first bit estimate. Step 801c establishes a third threshold (Vopt) to distinguish first bit estimates between the first and second thresholds. Step 802a supplies the first bit estimate for comparison in response to distinguishing the serial data stream input at the first, second, and third thresholds. Step 802b compares a first bit estimate in the serial data stream to a second bit value received prior to the first bit. Step 802c compares the first bit estimate to a third bit value received subsequent to the first bit. Step 802d, in response to the comparisons, determines the value of the first bit.

In other aspects, establishing a third threshold (Vopt) to distinguish first bit estimates between the first and second thresholds in Step 801c includes substeps (not shown). Step 801c1 distinguishes serial data stream inputs below first threshold and above the third threshold as a "0" if both the second and third bits are "1" values, as a "1" if only one of the second and third bits is a "1" value, and as "1" if both the second and third bits are a "0" value. Step 801c2 distinguishes serial data stream inputs above the second threshold and below the third threshold as a "1" if both the second and third bits are a "0" value, as a "0" if only one of the second and third values is a "0" value, and as a "0" if both the second and third bits are a "1" value.

In other aspects, receiving a serial data stream in Step 802 includes receiving a serial data stream encoded with forward error correction (FEC), and the method comprises further steps. Step 802e, following the determination of the first bit values, FEC decodes the first bit values. Step 802f uses the FEC corrections of the first bit values to adjust the first, second, and third threshold values. In other aspects, using the FEC corrections of the first bit values to adjust the first, second, and third threshold values includes using FEC error statistics to adjust the thresholds.

Step 802b may adjust the thresholds by evaluating the number of errors associated with a plurality of three-bit sequence combinations, where each sequence includes the second bit value, followed by the first (center) bit value, followed by the third bit value, and the error is in the first (center) bit value. Step 802b may evaluate the number of errors associated with a plurality of three-bit sequence combinations by comparing the number of errors between different groups of three-bit sequences.

Step 802b may adjust the thresholds to balance the number of errors between a first group of three-bit sequences and a second group of three-bit sequences. For example, by comparing different groups of three-bit sequences, where the first (center) bit value has been FEC corrected, or by comparing different groups of three-bit sequences, where the first (center) and second bit values have been FEC corrected. Alternately, different groups of three-bit sequences are compared, where the first (center) and third bit values have been FEC corrected.

In other aspects, receiving a serial data stream input in Step 802 includes receiving a serial data stream input selected from the group including non-return to zero (NRZ), return to zero (RZ), binary symmetric, binary asymmetric, binary communication protocols where the clock is recovered from the data stream, and binary communication protocols where the clock is supplied as an independent signal.

In other aspects, receiving a serial data stream input in Step 802 includes receiving a plurality of serial data stream inputs in parallel. Then, comparing a first bit value in the serial data stream determined at a first phase with respect to a clock, to a first bit value determined at a second phase (Step 804) includes making comparisons for each data stream. Calculating the optimal phase for the determination of first bit values in response to the comparisons (Step 806) includes determining the optimal phase for each data stream.

In some aspects, receiving a plurality of serial data stream inputs in Step 802 includes receiving a plurality of serial data stream inputs with information modulated in a protocol selected from the group including first-level phase-shift keying and first-level quadrature amplitude modulation.

A system and method have been provided for using phase adjustment in non-causal channel equalization. A few examples have been given to illustrate the invention. However, the invention is not limited to merely these examples. Other variations and embodiments of the invention will occur to those skilled in the art.

We claim:

1. A phase adjustable non-causal channel equalization system, the system comprising:
    a sampler having an input to receive a serial data stream, an input to receive a clock signal, an input to accept a control signal, and an output to provide samples of the serial data stream, sampled at a first phase and a second phase, with respect to a clock period, in response to the control signal;

a clock generator having an output to supply the clock signal with the clock period;

a non-causal comparator having an input connected to the sampler output to accept the samples, a input to accept threshold reference values, the non-causal comparator determining a first bit value for a current clock cycle by comparing a first bit estimate for the current clock cycle to bit values determined in non-current clock cycles, and having an output to supply a determination of first bit values responsive to the samples at the first phase, and a determination of first bit values responsive to the samples at the second phase; and an error analysis circuit having an input connected to the output of the non-causal comparator to accept first bit values, the error analysis circuit comparing first bit values responsive to the samples at the first phase, to first bit values responsive to the samples at the second phase, calculating an optimal phase for the determination of first bit values, and supplying the control signal to the sampler, responsive to the optimal phase;

wherein the non-causal comparator includes:

a multi-threshold circuit having an input connected to the sampler output to accept the samples, an input to accept threshold values, and outputs to provide a plurality of bit estimates for each sample, responsive to a plurality of voltage threshold levels; and, a non-causal circuit having inputs to accept bit estimates from the multi-threshold circuit and an output to supply the first bit value for a current clock in response to comparing the first bit estimate for the current clock cycle to bit values determined in non-current clock cycles, the non-causal circuit having an output connected to the error analysis circuit input to supply the first bit value; and wherein the non-causal circuit includes:

a future decision circuit having inputs connected to the mutli-threshold circuit outputs to accept the bit estimates, the future decision circuit having outputs to supply the first bit estimate and a third bit value;

a present decision circuit having inputs to accept the first bit estimate, the third bit value, and a second bit value, the present decision circuit comparing the first bit estimate to both the second bit value, determined for a clock period prior to the current clock cycle, and the third bit value, determined for a clock cycle subsequent to the current clock cycle, the present decision circuit having an output to supply the first bit value determined in response to comparing the first bit estimate to the second and third bit values; and, a past decision circuit having an input to accept the first bit value and an output to supply the second bit value.

2. The system of claim 1 wherein the sampler receives a serial data stream encoded with forward error correction (FEC); and, wherein the error analysis circuit includes an FEC circuit for decoding the first bit values, the error analysis calculating error rates for the first bit values responsive to the samples at the first and second phases, and identifying the optimal phase as the phase associated with a lower first bit error rate.

3. The system of claim 2 wherein the sampler supplies samples, sampled at a plurality of relative phases respective to the clock signal; and, wherein the error analysis circuit determines error rates for first bit values responsive to samples at each of the plurality of relative phases.

4. The system of claim 3 wherein the sampler, using the clock signal as a reference, defines n phases in the clock period; and, wherein the error analysis circuit determines the bit error rate (BER) for first bit values responsive to samples at each of the n phases.

5. The system of claim 4 wherein the sampler defines n phases in the clock period as follows:

defining a time A as a start phase;

defining a time B as an end phase;

defining the time between phases as (B−A)/n, where n is the number of phases being defined; and, defining a series of relative phase positions (i) in the clock period as:

$i=A, A+(B-A)/n, \ldots B-(B-A)/n, B.$

6. The system of claim 5 wherein the error analysis circuit calculates an optimum clock phase (Q) by considering each phase position (i), weighted by its respective BER as follows:

$$Q = \sum_{i=A}^{B} i * f(BER_i);$$

where f(x) is a function of x.

7. The system of claim 5 further comprising:

a memory having a port connected to the error analysis circuit for accessing a plurality of calculated BERs cross-referenced to error counts in a look-up table (LUT); and, wherein the error analysis circuit determines the bit error rate (BER) for first bit values responsive to samples at each of the n phases by counting the number of errors associated with each phase and accessing the LUT in memory for the BER cross-referenced to the error count.

8. The system of claim 1 wherein the multi-threshold circuit includes:

a first comparator having an input to accept the sample, an input establishing a first threshold (V1), and an output to supply a signal distinguishing when the sample has a high probability of being a "1" bit value;

a second comparator having an input to accept the sample, an input establishing a second threshold (V0), and an output to supply a signal distinguishing when the sample has a high probability of being a "0" bit value; and, a third comparator having an input to accept the sample, an input establishing a third threshold (Vopt), and an output to provide a signal when the sample has an approximately equal probability of being a "0" value as a "1" value.

9. The system of claim 8 wherein the future decision circuit supplies a first bit estimate for a sample below the third threshold and above the second threshold;

wherein the present decision circuit, in response, supplies:

a first bit value of "1" if both the second and third bit value are "0" values;

a first bit value of "0" if only one of the second and third bit values is a "0" value; and, a first bit value of "0" if both the second and third bit values are a "1".

10. The system of claim 9 wherein the future decision circuit supplies a first bit estimate for a sample the third threshold and below the first threshold;
   wherein the present decision circuit, in response, supplies:
      a first bit value of "0" if both the second and third bit value are "1" values;
      a first bit value of "1" if only one of the second and third bit values is a "1" value; and,
      a first bit value of "1" if both the second and third bit values are a "0".

11. The system of claim 10 wherein the sampler accepts a serial data stream encoded with forward error correction (FEC); and,
   wherein the error analysis circuit includes an FEC circuit for decoding the first bit values, the error analysis circuit calculating error rates associated with the first and second phases, and identifying the optimal phase as the phase associated with a lower first bit error rate, the error analysis circuit having an additional output to supply first bit correction statistics.

12. The system of claim 11 further comprising:
   a first plurality of samplers, each accepting a corresponding serial data stream;
   a first plurality of multi-threshold circuits, each having an input connected to the output of a corresponding sampler;
   a first plurality of non-causal circuits, each having inputs to accept bit estimates from a corresponding multi-threshold decision circuit; and,
   a first plurality of error analysis circuits, each error analysis circuit having an input connected to the output of a corresponding non-causal circuit.

13. The system of claim 12 wherein the first plurality of samplers accept information modulated in a format selected from the group including first-level phase-shift keying and first-level quadrature amplitude modulation format.

14. The system of claim 11 further comprising:
   a statistics calculator having an input to accept first bit correction statistics from the error analysis circuit and an output to supply threshold values to the multi-threshold circuit in response to the correction statistics.

15. The system of claim 14 wherein the statistics calculator evaluates the number of errors associated with a plurality of three-bit sequence combinations, where each sequence includes the second bit value, followed by the first (center) bit value, followed by the third bit value, and the error is in the first (center) bit value.

16. The system of claim 15 wherein the statistic calculator evaluates the number of errors associated with a plurality of three-bit sequence combinations by comparing the number of errors between different groups of three-bit sequences.

17. The system of claim 16 wherein the statistics calculator adjusts the thresholds to balance the number of errors between a first group of three-bit sequences and a second group of three-bit sequences.

18. The system of claim 16 wherein the statistics calculator evaluates the number of errors associated with a plurality of three-bit sequence combinations by comparing different groups of three-bit sequences, where the first (center) bit value has been FEC corrected.

19. The system of claim 16 wherein the statistics calculator evaluates the number of errors associated with a plurality of three-bit sequence combinations by comparing different groups of three-bit sequences, where the first (center) and second bit values have been FEC corrected.

20. The system of claim 16 wherein the statistics calculator evaluates the number of errors associated with a plurality of three-bit sequence combinations by comparing different groups of three-bit sequences, where the first (center) and third bit values have been FEC corrected.

21. The system of claim 1 wherein the sampler accepts a serial data stream formatted in a code format selected from the group including non-return to zero (NRZ) and return to zero (RZ), and a channel selected from the group including binary symmetric and binary asymmetric; and,
   wherein the clock generator has an input to accept the serial data stream, and wherein the clock generator supplies a clock signal generated from the serial data stream.

22. A phase adjustable non-causal channel equalization system, the system comprising:
   a sampler having an input to receive a serial data stream, an input to receive a clock signal, an input to accept a control signal, and an output to provide samples of the serial data stream, sampled at a first phase and a second phase, with respect to the clock period, in response to the control signal;
   a clock generator having an output to supply the clock signal with the clock period;
   a non-causal comparator having an input connected to the sampler output to accept the samples, a input to accept threshold reference values, and an output to supply a determination of first bit values responsive to the samples at the first phase, and a determination of first bit values responsive to the samples at the second phase;
   an error analysis circuit having an input connected to the output of the non-causal comparator to accept first bit values, the error analysis circuit comparing first bit values responsive to the samples at the first phase, to first bit values responsive to the samples at the second phase, calculating an optimal phase for the determination of first bit values, and supplying the control signal to the sampler, responsive to the optimal phase;
   wherein the non-causal comparator includes:
      a multi-threshold circuit having an input connected to the sampler output to accept the samples, an input to accept threshold values, and outputs to provide a plurality of bit estimates for each sample, responsive to a plurality of voltage threshold levels; and,
      a non-causal circuit having inputs to accept bit estimates from the multi-threshold circuit and an output to supply a first bit value for a current clock in response to comparing a first bit estimate for the current clock cycle to bit values determined in non-current clock cycles, the non-causal circuit having an output connected to the error analysis circuit input to supply the first bit value; and
   wherein the non-causal circuit includes:
      a future decision circuit having inputs connected to the mutli-threshold circuit outputs to accept the bit estimates, the future decision circuit having outputs to supply the first bit estimate and a third bit value;
      a present decision circuit having inputs to accept the first bit estimate, the third bit value, and a second bit value, the present decision circuit comparing the first bit estimate to both the second bit value, determined for a clock period prior to the current clock cycle, and the third bit value, determined for a clock cycle subsequent to the current clock cycle, the present decision circuit having an output to supply the first bit value determined in response to comparing the first bit estimate to the second and third bit values; and,
      a past decision circuit having an input to accept the first bit value and an output to supply the second bit value.

* * * * *